Patented Feb. 11, 1941

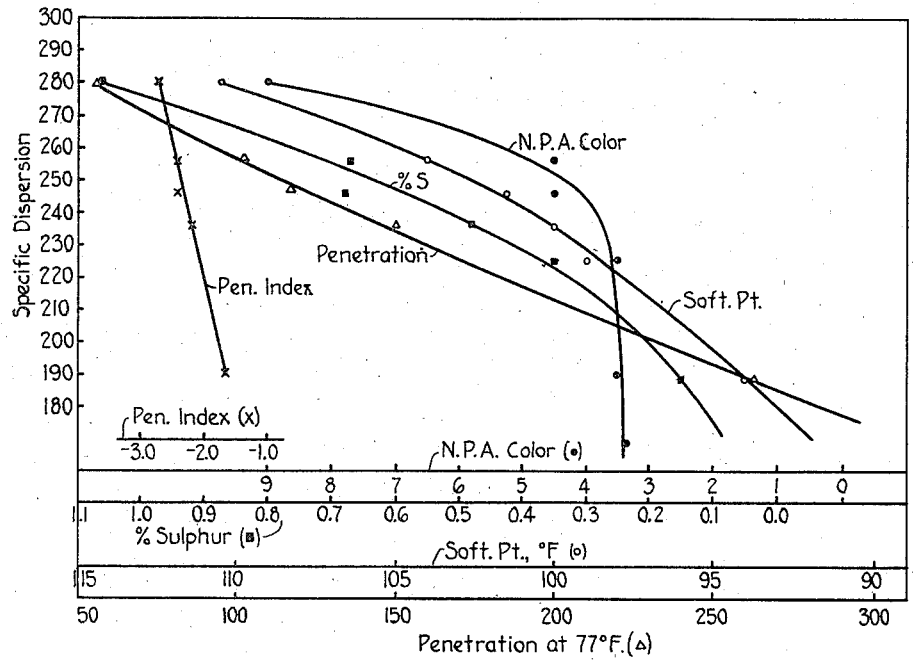
Fig. I
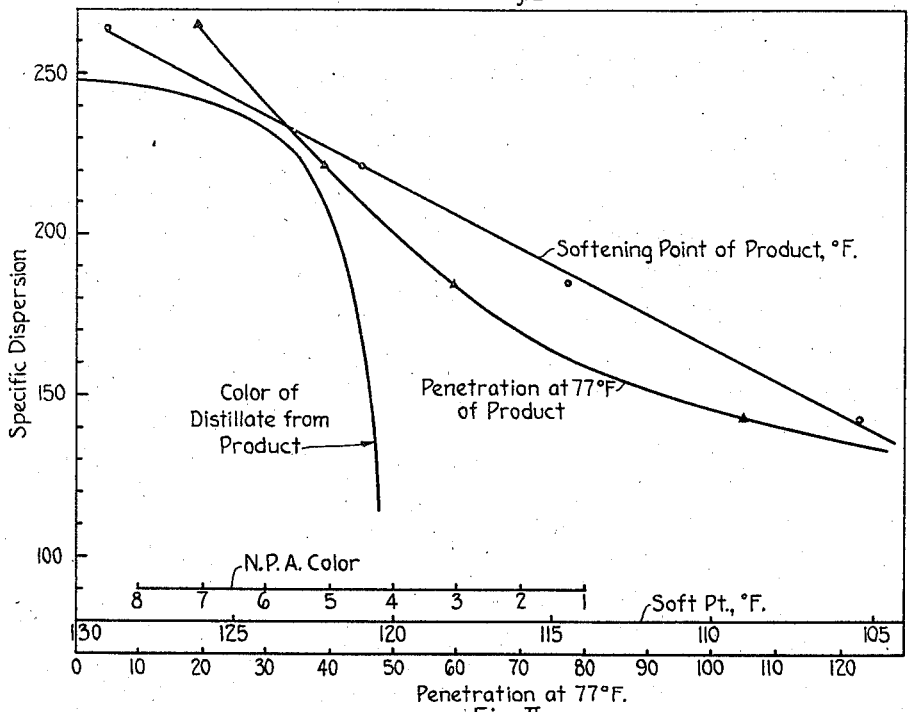
Fig. II
Inventor: Alvin P. Anderson
By his Attorney:

2,231,419

UNITED STATES PATENT OFFICE 2,231,419

TRANSPARENT PETROLEUM PLASTICS

Alvin P. Anderson, Berkeley, Calif., assignor to Shell Development Company, San Francisco, Calif., a corporation of Delaware Application September 5, 1939, Serial No. 293,339

17 Claims. (Cl. 196—22)

It has previously been proposed to make translucent petroleum plastics from petroleum oils by the methods set out in my Patent 2,201,466, dated May 21, 1940 and the U. S. Patent 1,989,045 to Merrill and 2,029,288 to Bray. According to my Patent 2,201,466 translucent plastics may be produced from Mid-Continent (mixed base) oils which have been topped and deasphalted by extracting the oil with a naphthenic solvent to produce a raffinate and an extract and redistilling the extract to produce a semi-solid or solid plastic. When Western (asphaltic base) oils are used the raffinate produced with a naphthenic solvent such as sulphur dioxide is re-extracted with a stronger naphthenic solvent such as furfural to produce a secondary extract. This secondary extract contains the desired plastic and may be redistilled to the desired consistency. According to the Merrill patent translucent petroleum plastics may be produced by extracting a Western petroleum asphalt-free oil with a naphthenic solvent and removing the lower boiling components from the extract by distillation. The plastics made by the former process are more resistant to oxidation, have a higher penetration index and are substantially insoluble in acetone, while the latter are more readily oxidized, have a lower penetration index and are substantially soluble in equal volumes of acetone at 77° F. According to the Bray patent such plastics may be prepared by distilling a cracked material. It further has been suggested that petroleum plastics may be made by precipitating them from their asphaltene-free solutions in petroleum oils by the use of normally gaseous hydrocarbons. One such method is set out in the patent application of Pilat and Godlewicz Serial No. 708,988 filed January 30, 1934 and another in U. S. Patent 2,143,882 to Keith.

It is the object of the present invention to greatly improve the color of the heretofore known petroleum plastics. It is a further object of this invention to increase the stability of petroleum plastics. Further objects will appear later in the specification.

It has now been found that by subjecting the previously known petroleum plastics to complete or partial hydrogenation that their color can be greatly improved, and that the plastics are rendered more stable to oxidation, e. g. discoloration upon exposure to air and light as a result of the hydrogenation.

As the plastics are hydrogenated it has been observed that the penetration is raised, the amount of the increase being roughly proportionate to the amount of hydrogen added. However, the improvement in color has been found to be greatest when only a relatively small amount of hydrogen has been added, increasing degrees of hydrogenation not creating corresponding improvements in color. In general, substantially most of the improvement in color which is obtainable by hydrogenation may normally be achieved when the hydrogenation is less than 50% complete, and often less than 10% complete. Particularly susceptible to rapid color improvement are distilled petroleum plastics which rarely require more than about 30% hydrogenation for substantial color improvement.

Frequently it is sufficient to hydrogenate the plastics to such a small extent that the reduction in the hydrogen pressure of the high pressure hydrogenation atmosphere is too small to register on ordinary pressure gauges and too small to change the specific dispersion to any material degree. For example, I have found that in this manner it is entirely possible to improve markedly the color and color stability without materially changing most of the other characteristics of the plastic, such as penetration, softening point, sulphur content, penetration index and solubility in furfural. The fact that the susceptibility to temperature and solubility in furfural do not substantially change shows that little actual hydrogenation takes place. Thus the present invention may readily be distinguished from efforts on hydrogenation in the past such as are disclosed in U. S. Patent 1,949,231; in the previous work there was always a marked decrease in the temperature susceptibility of the hydrocarbons and those which were originally soluble in furfural or other naphthenic solvents became substantially insoluble in them.

The improvement secured by a small degree of hydrogenation in one phase of the instant invention may be of great practical value, because it enables the production of very light colored, transparent plastics, in an inexpensive way, requiring little treating reagent and causing substantially no loss, i. e., reduction, in viscous properties such as penetration and softening point.

The heretofore known albino asphalts are translucent only when spread in very thin films, thick films appearing a greenish black by reflected light. To determine their colors, they are ordinarily diluted with 100 to 1,000 parts of carbon tetrachloride or other colorless solvent and the color expressed by the A. S. T. M. color (A. S. T. M. D155–34T). However, my hydrogenated plastics are not only translucent but actually transparent having very light colors that may ordinarily be observed without dilution, although some of the darker hydrogenated plastics may require dilution with 9 parts of solvent to bring them within the reading range of the standard color machines. Usually it is very easy to read newsprint through a slab of the slightly hydrogenated plastic an inch in thickness. In the claims "transparent" is defined as representing A. S. T. M. colors of 8 or less.

Completeness of hydrogenation may be measured by reduction of the specific dispersion of the plastic. It has been shown (Industrial and Engineering Chemistry, 29, page 319, 1937) that the specific dispersion is a measure of aromaticity, very aromatic substances having specific dispersions in excess of 200, and paraffins and naphthenes having specific dispersion of about 98. Therefore, an exhaustively hydrogenated albino asphalt has a specific dispersion of about 100 or slightly less. The approximate degree of hydrogenation actually achieved may then be expressed in per cent of the total obtainable by exhaustive hydrogenation and may be calculated by the formula $$\frac{A-B}{A-100} \times 100\%$$

wherein A=original specific dispersion, and B=specific dispersion of partially hydrogenated material.

Hydrogenation of the albino asphalts may be carried out in the usual hydrogenation equipment such as an autoclave or other device capable of withstanding high temperatures and pressure and which permits intimate contact between the catalyst, asphalt and hydrogen.

Any hydrogenation catalyst may be used such as nickel on kieselguhr and Raney nickel and those catalysts which are immune, or at least resistant to, sulphur such as those set out in U. S. Patents 1,932,174 to Gaus et al. and 1,932,186 to Pier et al. are preferred. Molybdenum sulfide has been found to be a particularly good catalyst.

The temperature at which the hydrogenation is carried out may vary from 100 to 450° C., particularly good results being obtained from 250 to 350° C. The pressure should be at least 200 lbs. per square inch and is preferably over 2000 lbs. per square inch.

The following are specific examples of albino asphalts which were hydrogenated to different degrees, the samples being taken at different stages of the hydrogenation and numbered 1, 2, 3, etc., in the order in which they were withdrawn from the process. The specific dispersion is given in each instance. It should be noted that in each case the improvement in color is greatest for small changes in specific dispersion, and that greater changes in dispersion cause relatively smaller changes in color.

EXAMPLE I

From an Edeleanu extract of a Western oil having a Saybolt Universal viscosity of 150 at 210° F., an albino asphalt was prepared by distillation, all but a few percent being taken overhead. The albino had the following characteristics:

*Original albino asphalt*

| | |
|---|---|
| Specific gravity (A. S. T. M. D71-27) | 1.058 |
| Pen. at 77° F. 100 g. (A. S. T. M. D5-25) | 56 |
| Specific dispersion $\left(\frac{N_f - N_c}{d}\right) \times 10^4$ (Ind. Eng. Chem. 29, 319, 1937) | 280 |
| Softening point, °F. (A. S. T. M. D36-26) | 110.5 |
| Penetration index (Nat. Pet. News, vol. 30, No. 8, February 23, 1938) | −2.7 |
| Color (A. S. T. M. D155-34T), (diluted with 1000 parts CCl₄) | 2 |
| Refractive index $N_D^{20°C}$ (Abbe) | 1.620 |
| Sulphur percent (A. S. T. M. D129-34) | 1.07 |
| Solubility in acetone (equal parts by volume 77° F.) | Soluble |
| Solubility in furfural (300% at 250° F.) | Soluble |

This material was then hydrogenated at 260–280° C. at 2000–2500 lbs. with a Raney nickel catalyst. Samples were taken from time to time with the following results:

| Stage | 1 | 2 | 3 | 4 | 5 |
|---|---|---|---|---|---|
| Degree of hydrogenation in percent of total | 14 | 19 | 24 | 30 | 62 |
| Specific gravity | 1.048 | 1.044 | 1.040 | 1.036 | 1.013 |
| Pen. at 77° F. 100 g | 102 | 117 | 150 | 170 | 250+ |
| Specific dispersion | 255 | 246 | 236 | 225 | 168 |
| Softening point, °F | 104 | 101.5 | 100 | 99 | 84 |
| Penetration index | −2.4 | −2.4 | −2.2 | −2.0 | |
| Color (A. S. T. M. D115-34T) | 4½ | 4½ | 4 | 3½ | 3½ |
| Refractive index $N_D^{20°C}$ | 1.6057 | 1.6054 | 1.5987 | 1.5939 | 1.5603 |
| Sulphur, percent | 0.67 | 0.68 | 0.48 | 0.35 | 0.15 |
| Solubility in acetone (equal parts by volume at 77° F.) | Soluble | Soluble | Soluble | Soluble | Soluble |
| Solubility in furfural (300% at 250° F.) | Soluble | Soluble | Soluble | Soluble | Soluble |

Figure 1 is a graph showing the relationship of color, softening point, percentage of sulphur, penetration index and penetration index with the specific dispersion of the hydrogenated plastic at various stages of the hydrogenation. It should be noted that when the specific dispersion is lowered 50 points from 280 to 230 that the color changes from 9 (actually there is no such color; the 9 is used to designate a material too dark to give a reading) to a graph reading about 3.7 while lowering the specific dispersion 50 more points to 180 produces a color of 3.45; the change is less than that which can be observed with the A. S. T. M. instrument.

The color of the transparent plastics can be even further improved by distillation. When the hydrogenated plastic from the 5th stage was subjected to molecular distillation in which all but a few per cent were taken overhead, the color improved from 3½ to 2. Thus in the above example by a combination of hydrogenation and distillation the color is improved from 2 when diluted with 1000 parts of carbon tetrachloride to 2 undiluted.

EXAMPLE II

An acetone insoluble albino asphalt such as that described in my Patent 2,201,466, dated May 21, 1940, which was prepared by distilling a duo-sol (e. g., cresylic acid-propane) extract of a Mid-Continent oil to produce an overhead product have the following characteristics:

| | |
|---|---|
| Specific gravity | 1.028 |
| Penetration at 77° F. 100 g | 59 |
| Specific dispersion | 248 |
| Softening point, °F | 114 |
| Penetration index | −2.0 |
| Color (A. S. T. M. D155-34T), (diluted with 1000 parts CCl4) | 3 |
| Refractive index $N_D^{20°\,C}$ | 1.5945 |
| Sulphur, percent | 1.20 |
| Solubility in acetone (equal parts) percent | 12 |
| Solubility in furfural (300% at 250° F.) | Soluble |

This material was hydrogenated under the same conditions as Example 1 and produced the following results:

| Stage | 1 | 2 | 3 |
|---|---|---|---|
| Degree of hydrogenation in percent of total | 29 | 45 | 58 |
| Specific gravity at 20° C | 1.012 | 1.004 | 0.988 |
| Pen. at 77° F. 100 g | 118 | 162 | 243 |
| Specific dispersion | 205 | 182 | 162 |
| Softening point, °F | 104 | 100.5 | 94.5 |
| Pen. index | −2.0 | −1.8 | −1.8 |
| Color (A. S. T. M. D155-34T—10% in CCl4) | 7+ | 4½+ | 4½ |
| Refractive index $N_D^{20°\,C}$ | 1.5786 | 1.5635 | 1.5476 |
| Solubility in acetone (equal vol. at 77° F.) | 11% | 9% | 8% |
| Solubility in furfural (300% at 250° F.) | 85% | 70% | 60% |

Here again the color improves rapidly up to a certain point and then more slowly. It should be observed that lowering the specific dispersion from 182 to 162 does not improve the color materially.

EXAMPLE III

A 20 penetration residual product from a similar extract to Example II had the following properties:

| | |
|---|---|
| Specific gravity at 20° C | 1.032 |
| Pen. at 77° F., 100 g | 19 |
| Specific dispersion | 265 |
| Softening point, °F | 129 |
| Pen. index | −2.0 |
| Color (A. S. T. M. D153-34T—1% in CCl4) | 5 |
| Refractive index $N_D^{20°\,C}$ | 1.5989 |
| Sulphur | 1.25% |
| Sol. in acetone (equal vol. at 77° F.) | 8% |
| Sol. in furfural (300% at 250° F.) | Soluble |

This material was hydrogenated in the manner of the two foregoing examples with the following results:

| | | | |
|---|---|---|---|
| Degree of hydrogenation, per cent of total | 26 | 48 | 73 |
| Specific gravity at 20° C | 1.014 | 1.001 | 0.983 |
| Pen. at 77° F., 100 g | 39 | 59 | 105 |
| Specific dispersion | 222 | 186 | 144 |
| Softening point, °F | 129 | 114.5 | 105 |
| Pen. index | −1.9 | −1.9 | −2.0 |
| Color (1% in CCl4) | 4½ | 3½ | 3 |
| Refractive index $N_D^{20°\,C}$ | 1.5771 | 1.5650 | 1.5440 |
| Sol. in acetone (equal vol. at 77° F.) | 6% | 5% | 5% |
| Sol. in furfural (300% at 250° F.) | 59% | 51% | 41% |

Figure 2 shows the color, penetration and softening points plotted against the specific dispersion for different degrees of hydrogenation. To get away from the effect of certain high boiling materials in the residuum which tend to make the color of the plastics, all samples were distilled and the color of the overhead product plotted on Figure 2.

EXAMPLE IV

Another sample of the albino asphalt of Example I was hydrogenated using molybdenum sulfide as a catalyst. During hydrogenation the temperature was from 250° to 301° C. and the pressure was from 2400 to 2700 lbs. per square inch. The following results were obtained:

| | | |
|---|---|---|
| Degree of hydrogenation in per cent of total | | 16.7 |
| Specific gravity at 20° C | | 1.049 |
| Pen. at 77° F., 100 g | 82 | 93 |
| Specific dispersion | | 250 |
| Softening point, °F | 108 | 105 |
| Pen. index | −2.3 | −2.5 |
| Color (undiluted) | 5+ | 4+ |
| Refractive index $N_D^{20°\,C}$ | 1.615 | 1.613 |
| Solubility in furfural | | |

In the above example the actual hydrogenation was very slight as is shown by the small change in specific dispersion.

Three starting materials are disclosed in the above examples, all of which are classified as albino asphalts but which are derived from different starting stocks. By albino asphalt within the meaning of the present specification and claims is meant asphaltic petroleum products, both naturally occurring or formed by cracking and produced by extraction and/or precipitation methods, having an A. S. T. M. color of 3½ or less on dilution with 1000 parts of a clear solvent and having a measurable penetration.

It is sometimes desirable to raise the penetration and penetration index of the hydrogenated plastics. This may be done by blending the plastic with compatible synthetic resins such as methacrylic ester polymers, particularly the ethyl and higher esters, hydrocarbon polymers produced by polymerizing unsaturated hydrocarbons capable of forming polymeric homologous series, e. g. polyisobutylene, polystyrene, and other resins such as hydrogenated rubber etc.

I claim as my invention:

1. The process of improving the color of an albino asphalt comprising hydrogenating the albino asphalt.

2. The process of improving the color of an albino asphalt comprising hydrogenating the albino asphalt wherein the hydrogenation is less than 50% complete as calculated by the formula $$\frac{A-B}{A-100} \times 100\%$$

wherein A = the specific dispersion of the original albino asphalt and B = the specific dispersion of the partially hydrogenated albino asphalt.

3. The process of improving the color of an albino asphalt comprising hydrogenating the albino asphalt wherein the hydrogenation is from 10 to 30% complete as calculated by the formula $$\frac{A-B}{A-100} \times 100\%$$

wherein A = the specific dispersion of the original albino asphalt and B = the specific dispersion of the partially hydrogenated albino asphalt.

4. The process of claim 1 wherein the albino asphalt is produced by distillation of the extract derived from a mineral oil which has been topped and deasphalted and extracted with a naphthenic solvent.

5. The process of improving the color of an albino asphalt comprising hydrogenating the albino asphalt in the presence of a hydrogenation catalyst.

6. The process of improving the color of an albino asphalt comprising hydrogenating the albino asphalt in the presence of a sulfur resistant hydrogenation catalyst.

7. The process of improving the color of an albino asphalt comprising hydrogenating the albino asphalt to an extent insufficient to substantially change its viscous properties.

8. The process of improving the color of an albino asphalt comprising hydrogenating the albino asphalt and distilling the resulting hydrogenated product to produce a light colored overhead product.

9. The process of claim 8 wherein the distillation is a molecular distillation.

10. The process of producing a transparent petroleum plastic comprising hydrogenating an albino asphalt to an extent insufficient to substantially change its viscous properties, and decreasing the penetration and raising the penetration index of the resulting plastic by blending it with a hydrocarbon polymer produced by polymerizing unsaturated hydrocarbons capable of forming polymeric homologous series.

11. The process of producing a transparent petroleum plastic comprising hydrogenating an albino asphalt to an extent insufficient to substantially change its viscous properties, and decreasing the penetration and raising the penetration index of the resulting plastic by blending it with a compatible synthetic resin.

12. As a new product a transparent petroleum plastic comprising a hydrogenated albino asphalt.

13. As a new product a transparent petroleum plastic susceptible to hydrogenation comprising a hydrogenated albino asphalt, the color of which cannot be substantially improved by further hydrogenation.

14. As a new product a transparent petroleum plastic comprising a hydrogenated albino asphalt, the viscosity characteristics of which have not been substantially changed by hydrogenation.

15. As a new product a transparent petroleum plastic comprising a hydrogenated albino asphalt, the hydrogenation being less than 50% complete as calculated from the formula $$\frac{A-B}{A-100} \times 100\%$$

wherein $A$ = the specific dispersion of the original albino asphalt and $B$ = the specific dispersion of the partially hydrogenated albino asphalt.

16. As a new product a transparent petroleum plastic comprising a hydrogenated albino asphalt, the hydrogenation being from 10 to 30% complete as calculated from the formula $$\frac{A-B}{A-100} \times 100\%$$

wherein $A$ = the specific dispersion of the original albino asphalt and $B$ = the specific dispersion of the partially hydrogenated albino asphalt.

17. As a new composition of matter a transparent petroleum plastic comprising a hydrogenated albino asphalt which has been distilled overhead and which has an A. S. T. M. color of about 2.

ALVIN P. ANDERSON.